March 27, 1928.
C. H. HAPGOOD
1,663,983
PREDETERMINED WEIGHT SCALE
Filed Feb. 25, 1920
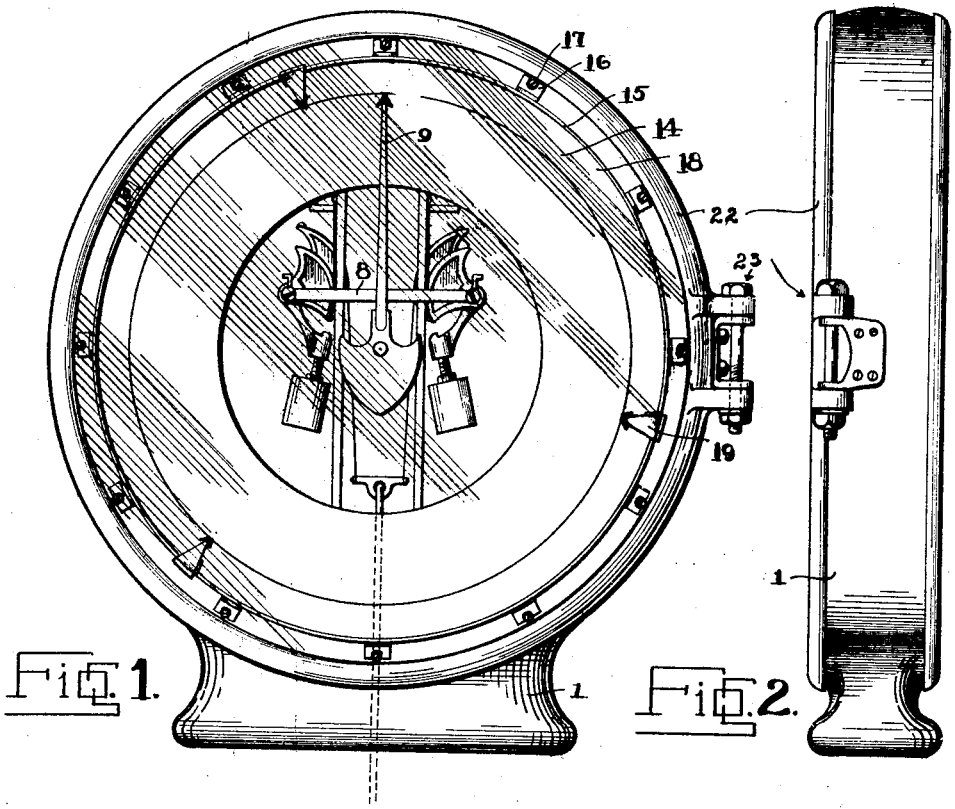
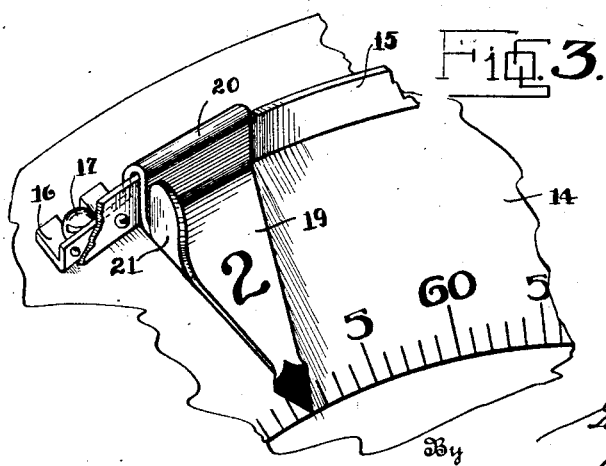
Inventor
Clarence H Hapgood
By George R. Frye
Attorney Patented Mar. 27, 1928.

1,663,983

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

PREDETERMINED-WEIGHT SCALE.

Application filed February 25, 1920. Serial No. 361,173.

This invention relates to weighing scales and particularly to the indicating mechanism thereof, and one of its principal objects is the provision of predetermined weight indicators for enhancing the usefulness of the scale in weighing out the ingredients of compounds.

Another object is the provision of a scale having a plurality of predetermined weight pointers so that the ingredients of a compound may be added without the aid of mental calculation, thereby reducing the liability of error and increasing the speed of operation.

Another object is the provision of a device for weighing out the ingredients of compounds which may be used by a person to whom the mixing formula has not been divulged.

Other objects and advantages will be apparent from the following description, in which reference is had to the accompanying drawings illustrating a preferred embodiment of my invention and in which similar reference numerals designate similar parts throughout the several views.

In the drawings:—

Figure 1 is a front elevation of a part of a scale embodying my invention;

Figure 2 is a side elevation of the same; and

Figure 3 is an enlarged detail perspective view of an adjustable predetermined weight indicator used in connection with a visibly graduated chart.

I have shown my invention in connection with weighing and indicating mechanism such as is shown and described in U. S. Letters Patent No. 1,285,141, issued to me November 19, 1918, but it is to be understood that my present invention is also adapted for employment in other types of scales and that I contemplate its use wherever applicable.

In the embodiment shown the indicating and automatic load-offsetting mechanism of the scale is shown as enclosed in a substantially watch-casing-shaped housing 1 having a crystal face through which the indicating and load-offsetting mechanism is visible.

Since the load-offsetting mechanism per se is fully described in my prior Patent No. 1,285,141, and since other types of load-offsetting mechanisms may be used in the predetermined weight scale herein described and claimed, I will not enter into a detailed description of the load-offsetting mechanism shown.

The indicator hand 9 is so connected to the load-offsetting mechanism as to be swung through an arc proportional to the weight of a load on the scale.

The dial 14 over which the hand swings may be graduated, as shown in Figure 3, so that the hand 9, when in weighing position, indicates the weight of the load offset in pounds and ounces. When the dial is so marked the scale may be used in ordinary weighing operations without disturbing the removable indicators.

As shown in Figure 3, a circular metal band 15 is secured to the face of the chart near the periphery thereof by means of angle brackets 16 and screws 17. When it is desired to conceal the graduations on the chart they are covered by means of an annular plate 18 which is interposed between the dial and the bracket 16. The dial, of course, may be left blank when it is desired to use the scale solely for secret compounding.

With each scale is provided a plurality of removable pointers or indicators 19, those illustrated being formed of sheet metal and provided with integral clips 20, adapted to resiliently grip the band 15, and with finger pieces 21 to facilitate attachment and detachment. The pointers of the removable indicators 19 and the indicator hand 9 are in the same plane so that there is no possibility of mistaking the position of the indicator hand on account of parallax due to the operator's position. The removable indicators may be successively numbered and the ingredients in a compound designated by corresponding numbers. Thus, for example, if 280 lbs. of No. 1 ingredient are to be used in a certain compound, the No. 1 indicator is set at 280 lbs. on the chart, and if 320 lbs. of No. 2 ingredient are to be used, the No. 2 indicator is set at 600 lbs., the sum of 280 and 320 lbs., and so on until an indicator is set for each ingredient. All that the operator then has to do is to put in No. 1 ingredient until the indicating hand points to the No. 1 removable indicator, add No. 2 ingredient until the indicating hand points to No. 2 removable indicator, and so on. He need not keep in mind or even know the numbers of pounds of the various ingredients, and need make no mental calculations whatever.

In order that the removable indicators may be readily accessible, the scroll 22 which carries the transparent face of the casing 1 is hinged, as at 23. The scroll may, if desired, be provided with a lock so that only authorized persons may have access to the removable indicators. Whenever a number of mixings are to be made under the same formula the foreman may set the indicators and lock the scroll and the indicators will be untouched until they are to be arranged for the next formula. When the dial is blank or when the graduations are concealed, test weights may be used to set the indicators.

It is believed to be apparent from the foregoing that I have provided a predetermined weight scale which is quickly adjustable to any compounding formula and yet is available for use in ordinary weighing.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a predetermined weight scale, in combination, a dial, an index co-operating therewith, an annulus secured upon said dial, and an adjustable indicator, means for mounting said indicator on said annulus, said mounting means being so arranged that said indicator is detachable.

2. In a predetermined weight scale, in combination, a dial, an index co-operating therewith, an annulus secured on said dial, and a plurality of distinctively marked indicators, means for mounting said indicators on said annulus, said mounting means being so arranged that said indicators are adjustable and detachable.

3. In a predetermined weight scale, in combination, a dial, an index co-operating therewith, an annulus fixed upon said dial, and a manually-adjustable indicator having a clip engageable with said annulus in a plurality of positions.

4. In a predetermined weight scale, in combination, a dial, an index co-operating therewith, an annulus fixed upon said dial, and a manually-adjustable indicator having a clip engageable with said annulus in a plurality of positions, said adjustable indicator also having a finger piece.

5. In a predetermined weight scale, in combination, a graduated dial, an index co-operating therewith, means for concealing the graduations on said dial, an annulus fixed to said dial, and a manually-adjustable indicator on said annulus.

CLARENCE H. HAPGOOD.